United States Patent [19]
Mathew et al.

[11] Patent Number: 6,150,050
[45] Date of Patent: Nov. 21, 2000

[54] METHOD FOR RECOVERING PARTICULATE MATERIAL FROM ELECTRICAL COMPONENTS

[75] Inventors: Santosh Mathew, Las Vegas; Krishna Menon, Henderosn; Chariclea Scordilis-Kelley, Henderson, all of Nev.; M. Yazid Saidi, Boise, Id.

[73] Assignee: Valence Technology, Inc, Henderson, Nev.

[21] Appl. No.: 09/038,679

[22] Filed: Mar. 9, 1998

[51] Int. Cl.$^7$ .......................... H01M 10/54; H01M 6/52
[52] U.S. Cl. ........................................... 429/49; 423/179.5
[58] Field of Search ............................ 429/49; 423/179.5

[56] References Cited

U.S. PATENT DOCUMENTS

| | | | |
|---|---|---|---|
| 5,015,541 | 5/1991 | Evans | 429/49 |
| 5,352,270 | 10/1994 | Shackle . | |
| 5,418,091 | 5/1995 | Gozdz et al. . | |
| 5,478,664 | 12/1995 | Kaneko et al. . | |
| 5,491,037 | 2/1996 | Kawakami . | |
| 5,714,129 | 2/1998 | Nishimura et al. | 429/49 X |
| 5,753,012 | 5/1998 | Firnhaber et al. | 95/65 |

FOREIGN PATENT DOCUMENTS

| | | |
|---|---|---|
| 0613198 A1 | 2/1994 | European Pat. Off. . |
| 0730316 A1 | 4/1996 | European Pat. Off. . |
| 7-335276 | 12/1995 | Japan . |
| 8-022846 | 1/1996 | Japan . |
| 9-195071 | 7/1997 | Japan . |

OTHER PUBLICATIONS

Gao, Yuan and J.R. Dahn, "The High Temperature Phase Diagram of $Li_{1+x}O_4$ and Its Implications"; The Electrochemical Society, Inc., vol. 143, No. 6, 1783–1788 (1996). (month N/A).

*Primary Examiner*—Maria Nuzzolillo
*Assistant Examiner*—Susy Tsang

[57] ABSTRACT

In one aspect, the invention provides a method for recovering particulate material from a component of an electrochemical cell. In another aspect, a method is provided for recovering metal oxide particulate active material. The metal oxide is effectively separated from other cell components and is rendered to a form reusable as an active material for a new electrochemical cell. In still another aspect, a method is provided for recovering lithium metal oxide particulate active material and for regenerating the lithium metal oxide active material back to its initial nominal condition usable as battery grade material in an electrochemical cell. In the latter aspect, the invention provides the capability of treating lithium-deficient metal oxide active material which has become lithium-deficient from repeated cycling in a cell. The lithium-deficient active material is characterized by a lesser lithium content as compared to its nominal initial condition before cycling in a cell. By the method of the invention, the lithium metal oxide spent material is regenerated to its nominal initial condition and usable as battery grade material to fabricate another cell. Particulate materials, recoverable by the various methods described herein, include, but are not limited to, metal oxides, lithium metal oxides, and graphitic/carbon materials.

19 Claims, 10 Drawing Sheets

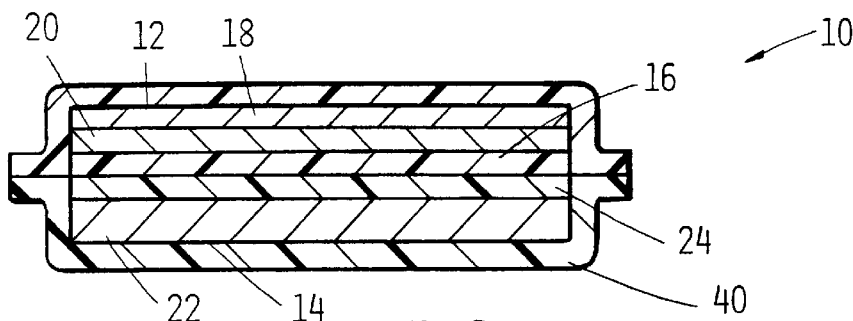
FIG. 1
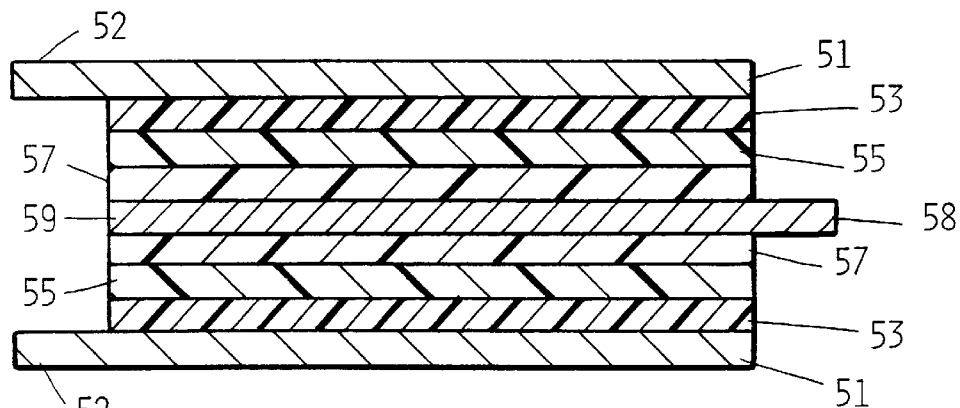
FIG. 2
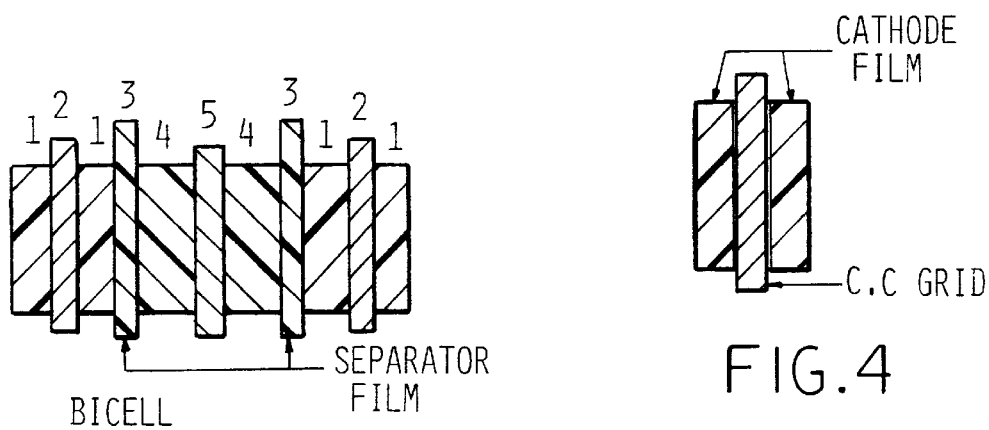
FIG. 3
FIG. 4
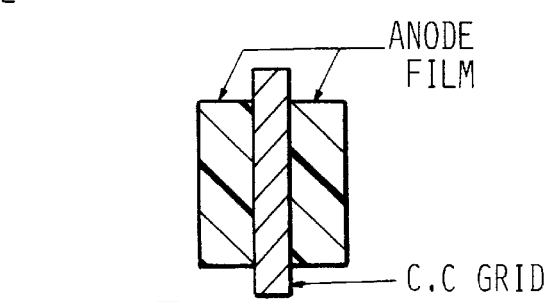
FIG. 5

METHOD FOR RECOVERING PARTICULATE MATERIAL FROM ELECTRICAL COMPONENTS

FIELD OF THE INVENTION

This invention relates to methods for recovering particles of material from electrochemical cells or batteries, and further relates to methods for regenerating recovered particulate active material for reuse as battery grade active material.

BACKGROUND OF THE INVENTION

Traditionally, there has not been a significant emphasis on recycling of spent batteries, cells, and electrical components. Although there has been some attempt to recycle lead acid batteries in the past, complex electrical components have not traditionally been recycled because of the logistics of concentrating a sufficient amount of recyclable electrical components in a single location and the hazards and potential complexity of the process technology. This is particularly the case when the electrical component to be recycled contains a material like lithium in metallic form which could be explosive.

Lithium cells, which use metallic lithium in the negative electrode, have been in practical use, have a relatively high energy density, and therefore have been used in large numbers in portable devices such as cameras and watches. Such cells containing lithium metal negative electrode or alkaline metal negative electrode are referred to as solid-state electrochemical cells. They typically contain the alkaline metal negative electrode, an ionically conducting polymeric electrolyte containing an ionizable alkaline metal salt, and a positive electrode.

The cathode is usually formed by preparing a mixture of an active material, a metal salt, a polymeric electrolyte, and a conductive filler such as carbon black, and coating this mixture on a metal foil which functions as a current collector. Electrochemical cells formed in this fashion using lithium metal as the alkali metal anode have found wide use in numerous applications requiring portable battery power, since lithium batteries formed in this manner have a high energy density. However, lithium metal is considered to be a source of safety-related problems. Metallic lithium generates hydrogen upon reaction with water and organic solvents. This poses a danger of ignition when attempting to treat them for recovery of the lithium metal.

Given the high reactivity of metallic lithium and its propensity to self-ignite on exposure to air and water, research concerning disposal of lithium cells has centered around safe methods for recovering metallic lithium from the cell. Examples of approaches for recovering metallic lithium are described in U.S. Pat. Nos. 5,352,270 and 5,491,037. In both of these patents, methods are described for recovering metallic lithium as safely as possible by opening the lithium cell in an ignition-free environment, washing the cell by submersion in water, and maintaining the cell submerged in water until the metallic lithium is converted to lithium hydroxide. Therefore, recycling of lithium cells to date has focused on methods for crushing and pulverizing the cell submerged under water and encouraging formation of lithium hydroxide as safely as possible. Components of the lithium cell which contain lithium in a non-metallic state are also addressed so that lithium salts may also be recovered along with the lithium hydroxide.

There is no mention of specific treatment for other cell components, besides the metallic lithium. For example, U.S. Pat. No. 5,491,037 describes that solid components other than metallic lithium may be simply sorted and disposed of by any variety of means including melting or pulverization. There is no description of processing of any cell components other than metallic lithium. In U.S. Pat. No. 5,352,270, likewise there is no discussion of recovery of other cell components besides the metallic lithium. In the prior art the objective has been to separate and recover lithium, with no treatment specified for other components. Therefore, what is needed is a method to recover other materials of an electrochemical cell, to foster the objective of recycling.

More specifically, prior art methods do not address recovery of active material present in the more modern generation of cells, where metallic lithium is not used as the active material. Therefore, early methods for disposal of lithium cells, which utilized lithium metal electrodes as the ion source, are not effective for recovery of the more modern intercalation active materials of present-day lithium ion cells, such as, carbon, graphite, metal oxides and lithium metal oxides. The most valuable for recovery and recycling are metal oxide and lithium metal oxide electrode active materials.

SUMMARY OF THE INVENTION

The invention provides a method for recovering a wide variety of particulate material from a component of an electrochemical cell. The method is most valuable for recovering particulate active material, such as metal oxide (MTO) and lithium metal oxide (LMTO). The metal oxide (MTO) is effectively separated from other cell components and is rendered to a form reusable as an active material for a new electrochemical cell. In still another aspect, a method is provided for recovering lithium deficient, lithium metal oxide (LMTO) particulate active material and for regenerating the LMTO active material back to its initial, nominal, lithiated condition usable as battery grade material in an electrochemical cell.

In the latter aspect, the invention provides the capability of treating lithium-deficient metal oxide active material which has become lithium-deficient from repeated cycling in a cell. The lithium-deficient active material is characterized by a lesser lithium content as compared to its nominal initial condition before cycling in a cell. By the method of the invention, the lithium metal oxide spent material is regenerated to its nominal initial condition and usable as battery grade material to fabricate another cell. Particulate active materials, recoverable by the various methods described herein, include, but are not limited to, lithium manganese oxide ($LiMn_2O_4$; $Li_2Mn_2O_4$; $Li_xMn_2O_4 1 \leq x \leq 2$; $Li_{1+x}Mn_{2-x}O_4$, $0 \leq x \leq 0.2$), lithium cobalt oxide ($LiCoO_2$), lithium nickel oxide ($LiNiO_2$), and graphitic active materials. The invention is most advantageous for the recovery and regeneration of lithium metal oxide particulate active material. This is because the lithium-deficient metal oxide active materials are both recovered and regenerated by the method of the invention.

Based on an exemplary lithium metal oxide (LMTO) active material, the two alternative methods of the invention generally include the steps of FIGS. 6 and 7. The wet process alternative is illustrated in FIG. 6, and the dry process alternative is illustrated in FIG. 7. First, the used cell, typically a bicell, is fully discharged to a relatively safe condition. Next, the cover of the bicell is removed. The positive electrode/current collector assembly is peeled away from adjacent portions of the bicell laminate. (See FIGS. 6 and 7, steps 1, 2 and 3). The electrode portion of the assembly generally comprises the LMTO active material, particles of a conductive diluent, typically carbon particles, and the polymeric binder. Since liquid electrolyte is used in the bicell, the electrolyte impregnates through all the bicell layers and is present in the positive electrode. The peeled out electrode contains at least one positive electrode film and the metal current collector. The separator film can easily be peeled away from the positive electrode assembly. This leaves the assembly containing the electrode comprising lithium metal oxide (LMTO), conductive carbon and binder.

The active material particles are separated from the binder and current collector by one of two preferred methods. In one method, designated as the solvent or wet method (FIG. 6), a solvent is selected which does not dissolve the LMO or the current collector. The assembly is placed in the solvent, and the binder is dissolved in the solvent forming a solution. The current collector is released upon dissolution of the binder. The dissolved polymer and suspended particles of the LMTO are contained in the solution along with particles of carbon. The solution is filtered to separate the particulate matter, LMTO and carbon, from the solution. After filtering, the solution comprises solvent, dissolved polymer, electrolyte salt and electrolyte solvent.

The filtered particulate matter is checked to determine the ratio of lithium to manganese in the recovered LMTO. A lithium compound is then added to the particulate matter in an amount necessary to increase the lithium content of the LMTO active material back to the desired nominal formula for reuse as an active material. (for example at least $LiMn_2O_4$).

The solvent used in the process is desirably an organic solvent that has the capability to dissolve the polymeric binder and does not dissolve the active material. Exemplary desirable solvents are acetone, DMAC, DMF, DMSO, EtAc, MEK, NMP, THF and TEP. The lithium compound selected to lithiate the LMO may be selected from the group consisting of lithium carbonate ($Li_2CO_3$) and lithium chloride (LiCl), lithium nitrate ($LiNO_3$), lithium acetate ($LiCH_3COO$), lithium oxide ($Li_2O$), and lithium hydroxide (LiOH).

The lithiating step is conducted at a temperature sufficient to encourage reaction between the lithiating agent and the LMTO to achieve the desired result. The lithiating temperature must be below the melting point of the desired LMTO product. In the case of lithium manganese oxide, it is preferred that the lithiating temperature be achieved at a relatively slow ramp rate. The ramp rate is in a range of about 2° C. to about 5° C. per minute. Typically the heating is conducted by increasing the temperature from ambient to about 800° C. at a ramp rate of about 2° C. per minute. The heating is conducted in an atmosphere comprising oxygen, and an air atmosphere is adequate. At the ramp rate of 2° C. per minute, it takes about 6–7 hours to achieve 800° C. Then the temperature of 800° C., once achieved, is maintained for 12 hours. Next, cooling occurs at the same rate, in the range of about 2° C. to about 5° C. per minute, and it takes about 6–7 hours to cool back to ambient. This gives a total process time of about 25 hours.

The result of the process is to provide LMTO in a condition usable as an active material, and free from any polymeric or carbon impurities. If any polymeric impurities had remained with the LMTO after the filtration step, they also will be burned away during the heating stage when a temperature on the order of 500° C. is reached. Based on the ramp rate method of the invention, this material will burn off before lithiation occurs. Similarly, any solvent or electrolyte salt components that remain entrained with the LMTO material will also decompose, and the electrolyte salt merely adds to the lithiation of the LMO material in the regeneration step.

In an alternative method, designated as the dry method (FIG. 7), the LMTO is recovered and regenerated without the necessity of solvent extraction. In the dry method, the spent cell is discharged, and the electrode/current collector assembly is peeled away as described above. The electrode/current collector assembly is then heated with air/oxygen to a temperature sufficient to decompose, vaporize, oxidize, and/or burn off the polymeric and carbonaceous components of the assembly. The polymeric material decomposes and volatilizes at a temperature below about 400° C., the carbonaceous material burns at about 500° C., and all other impurities, if any, will also burn at temperatures near these ranges. Therefore, it is preferred to select a temperature greater than about 500° C. and on the order of about 600° C. for this process. The temperature selected to essentially burn off the polymer and carbon should be not so high as to cause melting of the active material, and not so high so as to cause melting of the current collector. It is preferred that the 600° C. temperature be achieved at a relatively slow rate from ambient, on the order of about 5° C. per minute. It is preferred that the 600° C. temperature be maintained for about an hour. After heating to burn off the polymer and carbon, the active material and current collector grid are slowly cooled, preferably at a rate of about 2° C. to about 5° C. per minute.

After cooling, the current collector grid is removed via a sieve which is used to separate the current collector grid from the LMTO particles. The LMTO particles are next analyzed to determine the ratio of lithium to manganese. The lithiating agent is then added in an amount necessary to achieve lithiation back to the nominal battery grade condition (for example at least $LiMn_2O_4$). The lithiation step is conducted by heating as per the conditions noted above earlier with respect to the solvent method. As in the case described earlier, it is preferred that the lithiating regeneration occur at about 800° C. in oxygen/air for about 12 hours, with the ramp rate of about 2° C. per minute for heating and cooling.

As can be seen, the aforesaid methods for recovering particulate active material from electrode/current collector assembly are applicable to a variety of particulate active materials including graphitic active material, metal oxide active material, and lithium metal oxide active material. Graphitic active material is easily disposable and very inexpensive. Therefore it is unlikely that carbonaceous particulate active material will necessarily be recovered by the aforesaid methods, even though such methods are usable. It is more likely that the aforesaid methods will be used for recovering metal oxide and lithium metal oxide active materials from electrode/current collector assemblies.

In the case where particulate electrode materials are recovered, and need not be regenerated (lithiated), then the regeneration steps are not practiced. In such a case, the assembly is treated by the wet or dry method to remove the current collector and remove the polymer to enable separation of the particulate electrode material. In the case where the solvent method is used, the solvent is selected to dissolve the polymer binder but not the metal oxide and optionally not the graphite. In the case where the dry method is used and the electrode material comprises graphite and binder, then the temperature may be selected to burn off the polymer but not burn the metal oxide and optionally not the graphite. In the case where the particulate material comprises metal oxide, it is recovered by heating the assembly at an elevated temperature to decompose and vaporize the binder. Thereafter, the particulate material comprising metal oxide is separated from the current collector. In the case where the particulate material comprises particles of carbon/graphite, the heating step may be selected to burn off both the binder and the carbonaceous material. Alternatively, the heating step may burn off only the polymer, and the carbon particles may remain with the metal oxide particles. The carbon/graphite particles may be later separated from the oxide particles. Where the electrode further comprises a lithium salt (i.e., $LiPF_6$) and the binder is VdF:HFP, it is desirable to treat the effluent gases from the heating, using a basic solution. In summary, the wet or solvent method may also be used to recover particulate electrode materials which need not be regenerated by lithiation.

The invention provides novel, economical, convenient and continuous processes for recovering electrode particulate material, and for regenerating lithium deficient particulate active material to a reusable battery material. Therefore, the overall processes, advantageously, combine recovery and regeneration. The processes minimize environmental impact by recycling rather than disposing used battery components.

Objects, features, and advantages of the invention include convenient and economical recovery of particulate material from a component of an electrochemical cell. Another object is the recovery of metal oxide in a form directly reusable as active material. Still another object is the regeneration of lithium deficient active material to a suitable lithium content for direct use in a cell. It is also an object to provide recovery of a wide variety of particulate materials, including, but not limited to, metal oxides, lithium metal oxides, and graphitic/carbon materials. Still another object is to recover particulate material in a manner which minimizes disposal of waste streams from the recovery process. Indeed, one of the process variations generates only carbon dioxide stream, and essentially there is no environmental impact.

These and other objects, features, and advantages will become apparent from the following description of the preferred embodiments, claims, and accompanying drawings.

BRIEF DESCRIPTION OF THE DRAWINGS

FIG. 1 is a diagrammatic representation of a typical laminated lithium-ion battery cell structure from which active materials are recovered according to the present invention.

FIG. 2 is a diagrammatic representation of a multicell battery cell structure from which active materials are recovered by the method of the present invention.

FIG. 3 is a schematic representation of a bicell battery cell structure from which active material is recovered by the method of the present invention.

FIG. 4 is a schematic representation of a cathode structure from which active material is recovered by the method of the present invention.

FIG. 5 is a schematic representation of an anode structure from which active material is recovered by the method of the present invention.

FIG. 14 is for a standard $LiMn_2O_4$ (LMO) compound from Kerr-McGee Chemical Company. FIG. 16 is for the recovered and regenerated LMO per the solvent recovery process of the invention. FIG. 18 is for the recovered and regenerated LMO per the dry recovery process of the invention.

FIG. 15 is for a standard $LiMn_2O_4$ (LMO) compound from Kerr-McGee Chemical Company. FIG. 17 is for the recovered and regenerated LMO per the solvent recovery process of the invention. FIG. 19 is for the recovered and regenerated LMO per the dry recovery process of the invention.

FIG. 16 is 502032 (LMO solvent process), and FIG. 18 is 502035 (LMO dry process).

FIG. 17 is 502032 (solvent process), and FIG. 19 is 502035 (dry process).

DETAILED DESCRIPTION OF THE PREFERRED EMBODIMENTS

In one aspect, the invention provides a method for recovering particulate material from a component of an electrochemical cell. In another aspect, a method is provided for recovering metal oxide particulate active material. The metal oxide is effectively separated from other cell components and is rendered to a form reusable as an active material for a new electrochemical cell. In still another aspect, a method is provided for recovering lithium metal oxide particulate active material and for regenerating the lithium metal oxide active material back to its initial nominal condition usable as battery grade material in an electrochemical cell. In the latter aspect, the invention provides the capability of treating lithium-deficient metal oxide active material which has become lithium-deficient from repeated cycling in a cell. The lithium-deficient active material is characterized by a lesser lithium content as compared to its nominal initial condition before cycling in a cell. By the method of the invention, the lithium metal oxide spent material is regenerated to its nominal initial condition and usable as battery grade material to fabricate another cell. Particulate materials, recoverable by the various methods described herein, include, but are not limited to, metal oxides, lithium metal oxides, and graphitic/carbon materials.

In one alternative, designated as the solvent or wet method (FIG. 6), an extraction solvent is used which does not dissolve the particulate material being recovered.

In another alternative, designated as the dry or heating method (FIG. 7), heat is used to burn off polymeric material and release the current collector grid in order to recover the desired particulate material.

Figure 6:
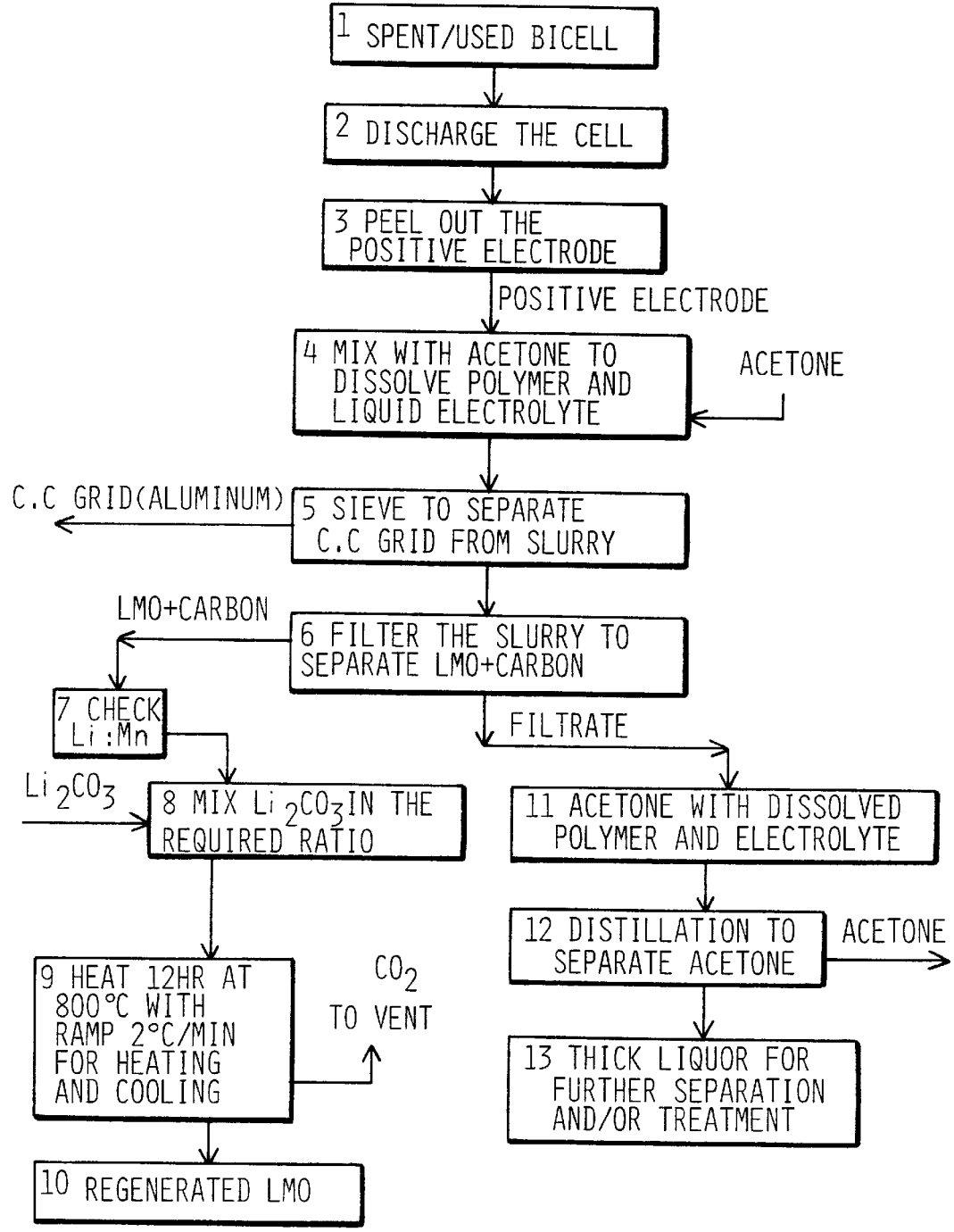
FIG. 6 is a schematic diagram showing a process for recovering particulate material from a battery or cell structure using the solvent recovery or wet method of the present invention. The regeneration steps are also shown.
Figure 7:
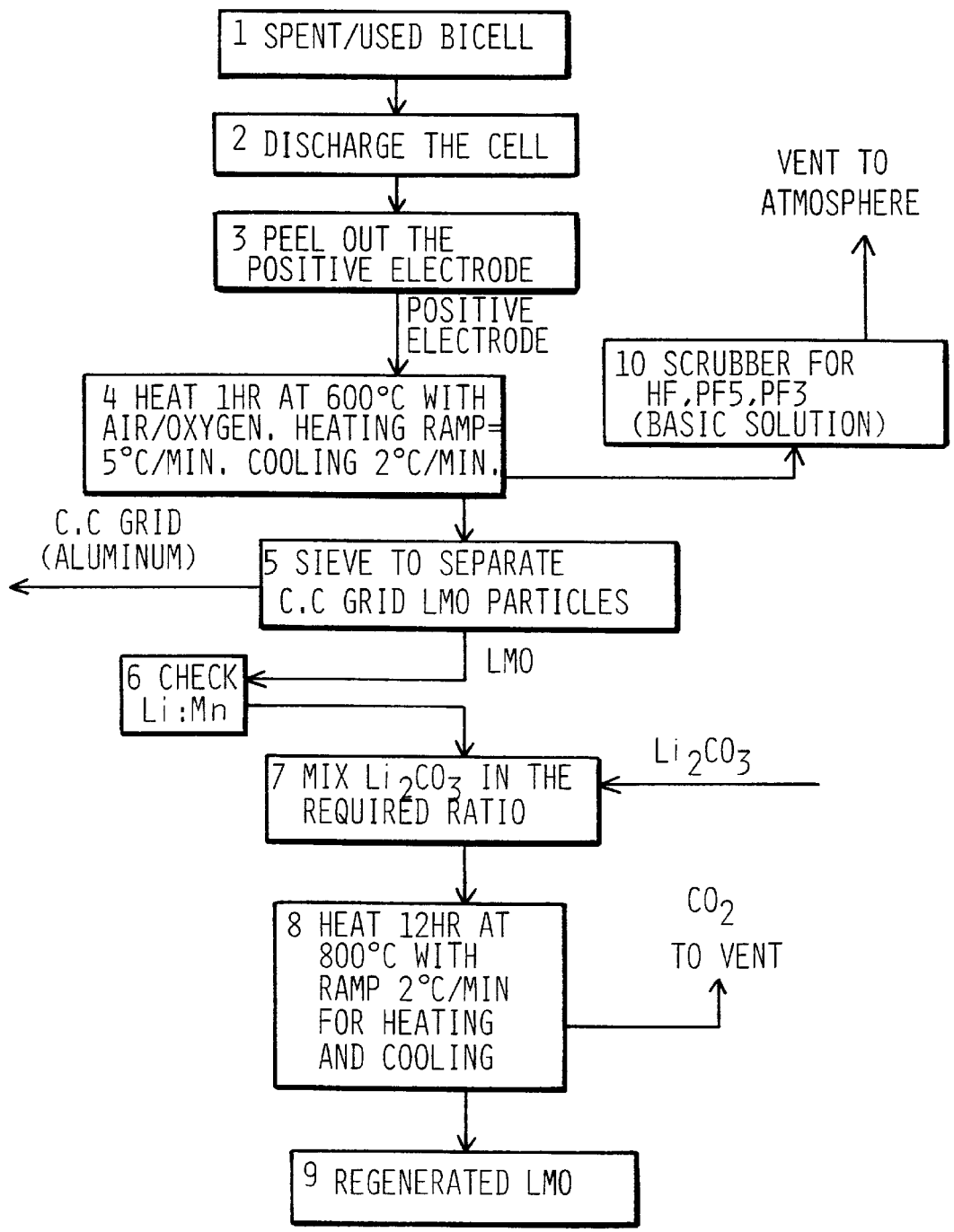
FIG. 7 is a schematic diagram showing a process for recovering particulate material from a battery or cell structure using the heat recovery or dry method of the present invention. Regeneration steps are also shown.

Before further describing the invention, it is useful to understand the structure of presently used laminated rechargeable batteries (FIGS. 1–5), which have materials that are recoverable by the invention (FIGS. 6 and 7).

Polymeric electrolytic cells comprise polymeric film composition electrodes and separator membranes. In particular, rechargeable lithium battery cells comprise an intermediate separator element containing an electrolyte solution through which lithium ions from a source electrode material move between cell electrodes during the charge/discharge cycles of the cell. In such cells an ion source electrode is a lithium compound or other material capable of intercalating lithium ions. An electrode separator membrane comprises a polymeric matrix made ionically conductive by the incorporation of an organic solution of a dissociable lithium salt which provides ionic mobility. Strong, flexible polymeric electrolytic cell separator membrane materials retain electrolyte lithium salt solutions and remain functional over temperatures ranging well below room temperature. These electrolyte membranes are used either in the usual manner as separator elements with mechanically assembled battery cell components, or in composite battery cells constructed of successively coated layers of electrode and electrolyte compositions.

A typical laminated battery cell structure 10 is depicted in FIG. 1. It comprises a negative electrode side 12, a positive electrode side 14, and an electrolyte/separator 16 therebetween. Negative electrode side 12 includes current collector 18, and positive electrode side 14 includes current collector 22. A copper collector foil 18, preferably in the form of an open mesh grid, upon which is laid a negative electrode membrane 20 comprising an intercalation material such as carbon or graphite or low-voltage lithium insertion compound, dispersed in a polymeric binder matrix. An electrolyte separator film 16 membrane of plasticized copolymer is positioned upon the electrode element and is covered with a positive electrode membrane 24 comprising a composition of a finely divided lithium intercalation compound in a polymeric binder matrix. An aluminum collector foil or grid 22 completes the assembly. Protective bagging material 40 covers the cell and prevents infiltration of air and moisture.

In another embodiment, a multicell battery configuration as per FIG. 2 is prepared with copper current collector 51, negative electrode 53, electrolyte/separator 55, positive electrode 57, and aluminum current collector 59. Tabs 52 and 58 of the current collector elements form respective terminals for the battery structure.

The relative weight proportions of the components of the positive electrode are generally: 50–90% by weight active material; 5–30% carbon black as the electric conductive diluent; and 3–20% binder chosen to hold all particulate materials in contact with one another without degrading ionic conductivity. Stated ranges are not critical, and the amount of active material in an electrode may range from 25–85 weight percent. The negative electrode comprises about 70–95% by weight of a preferred graphite, with the balance constituted by the binder. A typical electrolyte separator film comprises approximately two parts polymer for every one part of a preferred fumed silica. Before removal of the plasticizer, the separator film comprises about 20–70% by weight of the composition; the balance constituted by the polymer and fumed silica in the aforesaid relative weight proportion. The conductive solvent comprises any number of suitable solvents and salts. Desirable solvents and salts are described in U.S. Pat. Nos. 5,643,695 and 5,418,091. One example is a mixture of EC:PC:LiPF$_6$ in a weight ratio of about 50:44.3:5.7. Another is EC:DMC with one molar LiPF$_6$.

Those skilled in the art will understand that any number of methods are used to form films from the casting solution using conventional meter bar or doctor blade apparatus. It is usually sufficient to air-dry the films at moderate temperature to yield self-supporting films of copolymer composition. Lamination of assembled cell structures is accomplished by conventional means by pressing between metal plates at a temperature of about 120–160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

Separator membrane element 16 is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer.

Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are particularly suitable. Inorganic filler adjuncts, such as fumed alumina or silanized fumed silica, may be used to enhance the physical strength and melt viscosity of a separator membrane and, in some compositions, to increase the subsequent level of electrolyte solution absorption.

It should be understood that the present invention provides methods for recovering active material from both the positive and negative electrodes where such active material is in particulate form as in the case of the ion battery or the so-called "rocking-chair battery" which does not contain metallic lithium active material. However, the method of the invention is also usable to recover particulate active material from older generation of electrochemical cells where one of the electrodes contains particulate active material such as a metal oxide or a lithium metal oxide.

In its preferred embodiment, the method of the invention is used to recover metal oxide and lithium metal oxide intercalation compound from a positive electrode. It is particularly useful where the positive electrode is formed as a laminate film on a current collector. Such electrolytic cells are typically constructed by lamination of electrode and electrolyte elements which are individually prepared by coating, extrusion, or otherwise from compositions comprising the binder copolymer.

For example, in the construction of a lithium-ion battery, a current collector layer of aluminum foil or grid is overlaid with a positive electrode film, or membrane, separately prepared as a coated layer of a dispersion of intercalation electrode composition. This is typically an intercalation compound such as $LiMn_2O_4$ (LMO), $LiCoO_2$, or $LiNiO_2$, powder in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

Examples of forming cells containing metallic lithium anode, intercalation electrodes, solid electrolytes and liquid electrolytes can be found in U.S. Pat. Nos. 4,830,939; 4,935,317; 4,990,413; 4,792,504; 5,037,712; 5,463,179; 5,399,447; 5,482,795 and 5,411,820; each of which is incorporated herein by reference in its entirety. Note that the older generation of cells contained organic polymeric and inorganic electrolyte matrix materials, with the polymeric being most preferred. The polyethylene oxide of U.S. Pat. No. 5,411,820 is an example. More modern examples are the VdF:HFP polymeric matrix. Examples of casting, lamination and formation of cells using VdF:HFP are as described in U.S. Pat. Nos. 5,418,091; 5,460,904; and 5,456,000, assigned to Bell Communications Research, each of which is incorporated herein by reference in its entirety.

As can be seen by reference to the above structure and method of preparation, when it is desired to recycle cell components, it is possible to separate the laminate structure into any desired configuration of sub-structure. For example, when it is desired to recover active material from the positive electrode, it is possible to strip away components 57, 59, 57, as shown in FIG. 2; this comprises a positive electrode laminate 57, aluminum current collector 59, and another positive electrode laminate 57. For convenience, this will be referred to as an electrode/current collector assembly or electrode/current collector element. Although the invention will be described for illustrative purposes with respect to recovering positive electrode particulate material, it is to be understood that the method is equally applicable to recovering particulate material from the negative electrode 53, if such is desired. This is further made clearer by the representations of typical battery structures given in FIGS. 3, 4 and 5. FIG. 3 shows a typical bicell configuration where the part numbers indicated are the following designation: (1) Cathode Film; (2) Cathode Electrode Current Collector (Aluminum); (3) Separator Film; (4) Anode Film; and (5) Anode Electrode Current Collector (Copper). FIG. 4 shows a cathode electrode (positive electrode). It comprises two strips of cathode film carried on either side of a current collector grid. FIG. 5 shows an anode electrode (negative electrode) which comprises two anode films laminated on a current collector grid. In the cell, liquid electrolyte is used, and therefore it is present in each and every layer of the cell. The bicell is soaked in electrolyte. The electrolyte is a solution of a lithium salt in a solvent. As can be seen from the representations of FIGS. 1 through 5, it is possible to peel out the cathode electrode, comprising two films and a current collector grid, from the other layers of the spent bicell. It is also possible to peel out the anode electrode comprising two films and a current collector grid from the other layers. In the case of the configuration of FIG. 1, the electrode current collector element will comprise only one cathode film and one grid.

As stated above, the invention provides a method for recovering a wide variety of particulate material from a component of an electrochemical cell. Although particulate carbon and graphite are recoverable by the invention, it is most valuable for recovering metal oxide and lithium metal oxide active materials. It is most advantageous for recovering particulate metal oxide active material. The metal oxide (MTO) is effectively separated from other cell components and is rendered to a form reusable as an active material for a new electrochemical cell. In still another aspect, a method is provided for recovering lithium metal oxide particulate active material and for regenerating the lithium metal oxide active material back to its initial nominal condition usable as battery grade material in an electrochemical cell.

In the latter aspect, the invention provides the capability of treating lithium-deficient metal oxide active material which has become lithium-deficient from repeated cycling in a cell. The lithium-deficient active material is characterized by a lesser lithium content as compared to its nominal initial condition before cycling in a cell. By the method of the invention, the lithium metal oxide spent material is regenerated to its nominal initial condition and usable as battery grade material to fabricate another cell. Particulate active materials, recoverable by the various methods described herein, include, but are not limited to, lithium manganese oxide ($LiMn_2O_4$; $Li_2Mn_2O_4$; $Li_xMn_2O_4$, $1 \leq x \leq 2$; $Li_{1+x}Mn_{2-x}O_4$, $0 \leq x \leq 0.2$), lithium cobalt oxide ($LiCoO_2$), lithium nickel oxide ($LiNiO_2$), and graphitic active materials. The invention is most advantageous for the recovery and regeneration of lithium metal oxide particulate active material. This is because the lithium-deficient metal oxide active materials are both recovered and regenerated by the method of the invention. This aspect will be understood by reference to an exemplary lithium manganese oxide, $LiMn_2O_4$ (LMO). In an initial as-prepared condition, this oxide has a nominal composition, $LiMn_2O_4$. After cycling in a cell, when the spent cell is discharged, this composition is typically $Li_xMn_2O_4$, where x is less than 1, and it typically varies from about 0.75 to 0.85. As can be seen, the LMO in a spent cell is relatively lithium-deficient, as compared to its nominal initial condition. This same situation applies to other lithium metal oxides such as $LiCoO_2$ and $LiNiO_2$. A useful discussion of physical properties of $Li_{1+x}Mn_2O_4$, its lattice constants, X-ray patterns, and cycling performance versus Li content, and also a general discussion of heating and cooling methods are in J. Electrochem Society, V.143, No.6, June 1996. The quantity of lithium added in the present lithiation step is a matter of choice, depending on the performance characteristics desired. The invention is described with reference to the nominal $LiMn_2O_4$, but is not limited thereby.

Based on the exemplary $Li_xMn_2O_4$ (LMO) active material, the method of the invention generally includes the steps of FIGS. 6 and 7. First, the used cell, typically a bicell, is fully discharged to a relatively safe condition. Next, the cover of the bicell is removed. The positive electrode/current collector assembly is peeled away from adjacent portions of the bicell laminate. (See FIGS. 6 and 7, steps 1, 2 and 3). The electrode portion of the assembly generally comprises the LMO active material, particles of a conductive diluent, typically carbon particles, and the polymeric binder. Since liquid electrolyte is used in the bicell, the electrode is soaked in the electrolyte. That is, the electrolyte impregnates through all the bicell layers and is present in the positive electrode. The peeled out electrode contains the two positive electrode films and the current collector, typically an aluminum grid with imbibed therein, the electrolyte in liquid form. The separator film (layer 55 of FIG. 2) can easily be peeled away from the positive electrode assembly. This leaves the assembly containing the electrode comprising lithium manganese oxide, conductive carbon and binder.

The LMO active material particles are separated from the binder and current collector by one of two preferred methods. In one method, designated as the solvent or wet method (FIG. 6), a solvent is selected which does not dissolve the LMO or the current collector. The assembly is placed in the solvent, and the binder is dissolved in the solvent forming a solution. The current collector is released upon dissolution of the binder. The dissolved polymer and suspended particles of the LMO ($Li_{0.75}Mn_2O_4$) are contained in the solution along with particles of carbon. The solution is filtered to separate the particulate matter, LMO and carbon, from the solution. The separated LMO and carbon particles are the particulate matter. After filtering, the solution comprises solvent, dissolved polymer, electrolyte salt and electrolyte solvent. (FIG. 6, steps 4–6).

The filtered particulate matter is checked to determine the ratio of lithium to manganese in the recovered LMO. (FIG. 6, step 7). A lithium compound is then added to the particulate matter in an amount necessary to at least increase the lithium content of the LMO active material back to the nominal formula $LiMnO_4$. (FIG. 6, step 8). The LMO is reacted with the added lithiating compound at an elevated temperature. The elevated temperature is selected to be below the melting point of the LMO and is selected to cause reaction between the lithiating compound and the lithium-deficient LMO. As a result of this reaction, the lithium content of the LMO is increased to at least the desired nominal formula, $LiMn_2O_4$. (FIG. 6, steps 9 and 10).

The solvent is desirably an organic solvent, most desirably selected from the group of acetone and tetrahydrofuran, and preferably is acetone. (FIG. 6, step 4). The selection of solvent is not necessarily critical, so long as it has the capability to dissolve the polymeric binder and does not dissolve the active material. In the case of the common polymeric binder, vinylidene fluoride/hexafluoropropylene, acetone has been found to be adequate to conduct the dissolution at about ambient temperature.

Although the invention has been exemplified using acetone, a variety of solvents are usable. Table 1 lists exemplary solvents having polarity (polarisabilities for ground state hydrocarbon molecules/solvents: $10^{-24} cm^3$) in a range of 5 to 17, more specifically 5.3 to 16.4; and having H-bonding (kcal/mnol) in a range of 5 to 12, more specifically, 5.1 to 11.3. (See Table 1.)

The lithium compound selected to lithiate the LMO may be selected from the group consisting of lithium carbonate ($Li_2CO_3$) and lithium chloride (LiCl), lithium nitrate ($LiNO_3$), lithium acetate ($LiCH_3COO$), lithium oxide ($Li_2O$), and lithium hydroxide (LiOH). (FIG. 6, step 8). It is preferred that the lithiating compound be lithium carbonate, since during the lithiating reaction the effluent product carbon dioxide is generated, and may be merely vented to the atmosphere. Lithiating compounds such as chlorides and nitrates do not provide this equivalent advantage.

The lithiating step is conducted at a temperature sufficient to encourage reaction between the lithiating agent and the LMO to achieve the desired result. The lithiating temperature must be below the melting point of lithium manganese oxide, that is, below about 1,000° C., and it is preferably at least 700° C. It has been found that a temperature in a range of about 735° C. to 950° C. is usable, desirably the temperature is in a range of 775° C. to 850° C., and preferably the lithiating temperature is in a range of about 800° C. to 850° C. The lithiation requires a period of time to accomplish and is typically conducted for a period of about 12 hours. (FIG. 6, step 9).

It is preferred that the lithiating temperature be achieved at a relatively slow ramp rate. The ramp rate is in a range of about 2° C. to about 5° C. per minute. Typically the heating is conducted by increasing the temperature from ambient to about 800° C. at a ramp rate of about 2° C. per minute. The heating is conducted in an atmosphere comprising oxygen, and an air atmosphere is adequate. At the ramp rate of 2° C. per minute, it takes about 6–7 hours to achieve 800° C. Then the temperature of 800° C., once achieved, is maintained for 12 hours. Next, cooling occurs at the same rate in the range of about 2° C. to about 2° C. per minute and it takes about 6–7 hours to cool back to ambient This gives a total process time of about 25 hours.

As can be seen from the above description, the lithiation of the LMO particulate material occurs in the presence of the particulate carbon which has been filtered out along with the LMO. It is permissible to conduct the lithiation reaction in the presence of the carbon, since the carbon merely burns at a temperature of about 500° C., and will not interfere with the lithiation which occurs at a higher temperature range of about 725° C. to about 950° C. Therefore, the result of the process is to provide $LiMn_2O_4$ in a condition usable as an active material, and free from any polymeric or carbon impurities. If any polymeric impurities had remained with the LMO after the filtration step, they also will be burned away during the heating stage when a temperature on the order of 500° C. is reached. Based on the ramp rate method of the invention, this material will burn off before lithiation occurs. Similarly, any solvent or electrolyte salt components that remain entrained with the LMO material will also decompose, and the electrolyte salt merely adds to the lithiation of the LMO material in the regeneration step.

In an alternative method, designated as the dry method (FIG. 7), the LMO material $Li_{0.75}Mn_2O_4$ is recovered and regenerated without the necessity of solvent extraction. In the dry method, the spent cell is discharged, and the electrode/current collector assembly is peeled away as described above. (FIG. 7, steps 1, 2 and 3). The electrode/ current collector assembly is then heated with air/oxygen to a temperature sufficient to decompose, vaporize, oxidize, and/or burn off the polymeric and carbonaceous components of the assembly. (FIG. 7, step 4). The polymeric material decomposes and volatilizes at a temperature below about 400° C., the carbonaceous material burns at about 500° C., and all other impurities, if any, will also burn at temperatures near these ranges. Therefore, it is preferred to select a temperature greater than about 500° C. and on the order of about 600° C. for this process. The temperature selected to essentially burn off the polymer and carbon should be not so high as to cause melting of the active material, and not so high so as to cause melting of the current collector. It is preferred that the 600° C. temperature be achieved at a relatively slow rate from ambient, on the order of about 5° C. per minute. It is preferred that the 600° C. temperature be maintained for about an hour. After heating to burn off the polymer and carbon, the active material and current collector grid are slowly cooled, preferably at a rate of 2° C. per minute. At a ramp rate of 5° C. per minute, it takes about two hours to achieve 600° C. Then the 600° C. temperature, once achieved, is maintained for about one hour. Next, cooling occurs at about 2° C./minute, and it takes about five hours to cool back to ambient. This gives a total process time of about eight hours.

After cooling, the current collector grid is removed via a sieve which is used to separate the current collector grid from the LMO particles. (FIG. 7, step 5). The LMO particles are next analyzed to determine the ratio of lithium to manganese. (FIG. 7, step 6). The lithiating agent is then added in an amount necessary to achieve lithiation back to the nominal desired $LiMn_2O_4$. (FIG. 7, step 7). The lithiation step is conducted by heating as per the conditions noted above earlier with respect to the solvent method. (FIG. 7, step 8). As in the case described earlier, it is preferred that the lithiating regeneration occur at about 800° C. in oxygen/air for about 12 hours, with the ramp rate of about 2° C. per minute for heating and cooling. (FIG. 7, steps 8 and 9).

As can be seen, the aforesaid methods for recovering particulate active material from electrode/current collector assembly are applicable to a variety of particulate active materials including graphitic active material, metal oxide active material, and lithium metal oxide active material. Graphitic active material is easily disposable and very inexpensive. Therefore it is unlikely that carbonaceous particulate active material will necessarily be recovered by the aforesaid methods, even though such methods are usable. It is more likely that the aforesaid methods will be used for recovering metal oxide and lithium metal oxide active materials from electrode/current collector assemblies.

In the case where particulate electrode materials are recovered, and need not be regenerated (lithiated), then the regeneration steps are not practiced. In such a case, the assembly is treated by the wet or dry method to remove the current collector and remove the polymer to enable separation of the particulate electrode material. In the case where the solvent method is used, the solvent is selected to dissolve polymer binder but not the graphitic or metal oxide particulate. In the case where the dry method is used and the electrode material comprises graphite and binder, then the temperature may be selected to burn off the polymer but not burn the graphite. In the case where the particulate material comprises metal oxide, it is recovered by heating the assembly at an elevated temperature to decompose and vaporize the binder. Thereafter, the particulate material comprising metal oxide is separated from the current collector. In the case where the particulate material comprises particles of carbon, the heating step may be selected to burn off both the binder and the carbonaceous material. Alternatively, the heating step may burn off only the polymer, and the carbon particles may remain with the metal oxide particles. The carbon particles may be later separated from the oxide particles. Where the electrode further comprises a lithium salt (i.e., $LiPF_6$) and the binder is VdF:HFP, it is desirable to treat the effluent gases from the heating, using a basic solution. In summary, the wet or solvent method may also be used to recover particulate electrode materials which need not be regenerated by lithiation.

The wet and dry processes, as illustrated in respective FIGS. 6 and 7, were conducted. The following examples further illustrate such methods.

INTRODUCTION TO EXAMPLES 1 AND 2

The invention will be exemplified using a cathode electrode of a used battery based on the lithium polymer technology (U.S. Pat. Nos. 5,643,695 and 5,418,091). The cathode is a mixture of different components described earlier. The cathode of the all-plastic lithium battery is made up of lithium manganese oxide (LMO), conductive carbon, Kynar (PVDF-HFP copolymer) and electrolyte (a solution of Li salt in EC/DMC). It also contains a current collector (Al grid). The LMO present in the electrode of the spent battery was lithium deficient and needed to be relithiated. The standard LMO used in the manufacturing of this polymer battery has a molecular formula of $LiMn_2O_4$ and after several charge-discharge cycles, it became lithium deficient. Therefore, recycling of LMO from spent batteries was accomplished by separation of LMO followed by regeneration (i.e., relithiation).

Example 1

Solvent Extraction Method

In this process, FIG. 6, the separation of LMO particles from other cathode components was made possible by dissolving the soluble chemicals in acetone followed by filtration. Then, the separated LMO was relithiated at a high temperature with lithium carbonate taken in a stoichiometric ratio. During this process, an acetone based liquid waste was formed. Acetone is recoverable from the waste by distillation.

The peeled out cathode electrode from spent battery was first treated with acetone. Polymer dissolved in acetone leaving LMO particles suspended in the solvent. The suspended LMO and other undissolved substances were separated from the solvent by filtration. The separated sample was then analyzed for Li and Mn content using an inductively coupled plasma analyzer (ICP). This was then heated with calculated amount of lithium carbonate, to compensate for lost lithium, at 800° C. in a furnace, in air, for 12 hours. Slow heating and cooling rates (2° C. per minute) were used. Carbon and other combustible impurities were burned off at around 600° C. Relithiation occurred at about 800° C. The amount of lithium in the regenerated LMO was controlled by the amount of $Li_2CO_3$ added. ICP analysis was done for lithium and manganese percentages in the regenerated LMO.

In conducting the method, it was found that since liquid electrolyte was used in the bicell, the electrode was soaked in the electrolyte, and the electrolyte impregnates through all bicell layers and was present in every layer. The peeled out electrode contained only the two cathode films and the aluminum grid and the electrolyte in liquid form. It was found that the separator film (plastic electrolyte) was easily peeled away from the positive electrode if it is adhered to it when removed from the cell. When mixed with acetone, the binder readily dissolved in the acetone and, at the same time, the electrolyte also mixed with the acetone. The electrolyte, in this example, was a solution of EC/DMC solvent and $LiPF_6$ salt. LMO in the electrode was in particle form and was not soluble in the acetone. Carbon particles and the current collector grid were also not soluble. In step 4, after mixing with acetone, the binder and electrolyte became a part of the acetone solution and the undissolved LMO and carbon appeared as very small particles suspended in the solution. The current collector grid was almost the size of the electrode initially taken out of the cell, and it was easy to separate the grid alone. (Step 5.) This separated grid can be recycled as aluminum metal.

In step 6, filtration was conveniently done using filter media to separate all undissolved LMO and carbon particles from the solution of electrolyte and binder in acetone. From step 6 there were two process streams. A first liquid stream (filtrate) contained the electrolyte, polymer and acetone. The second stream contained the solid media, particles of LMO and carbon. The recovered LMO was lithium deficient, and lithium carbonate was added to compensate for this loss. It was found that lithium carbonate is the preferred source of lithiating agent. This is because lithium chloride and other lithium salts, although they may be used in place of lithium carbonate, often generate byproducts with exhaust that would require treatment. Thus, lithium carbonate, because of the simplicity of the reaction and the fact that the emission simply contains carbon dioxide, is preferred, from both the standpoint of reaction mechanism and minimization of environmental impact.

It was found that the regeneration steps, (steps 7–10, FIG. 6), accomplish two purposes: The LMO is relithiated (regenerated) by chemical reaction with the lithium carbonate. In addition, any impurities present will burn, along with the carbon. This is to be understood because at temperatures below about 400° C., all polymer impurities burn. At about 500° C. carbon burns. At 735° C., lithium carbonate melts and reaction with LMO begins. The preferred temperature for this lithiation is about 800 to about 850° C. Temperatures less than 775° C. are not recommended. A heating/soaking period of 12 hours was found to be suitable, based on experiments with the process. LMO melts above 1,000° C., and hence, temperatures above about 950° C. are not desired. As to the reaction occurring in step 9, it is considered a solid-phase reaction. The reaction is:

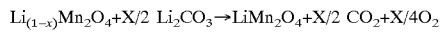

$$Li_{(1-x)}Mn_2O_4 + X/2\ Li_2CO_3 \rightarrow LiMn_2O_4 + X/2\ CO_2 + X/4O_2$$

Cooling was conveniently done inside the furnace itself. The high temperature of 800° C. and the presence of air resulted in no polymer being left in the regenerated LMO product of step 10. As mentioned earlier, the effluent from the furnace (FIG. 6, step 9) contained only carbon dioxide and no further treatment was needed.

Turning now to the filtrate stream, lithium salt in small quantities was present in the filtrate. Although recovery of the salt from solution is possible, this particular recovery was not addressed. However, when acetone is distilled out, the residual thick liquor is concentrated with salt and binder, which may be reused.

Figure 8:
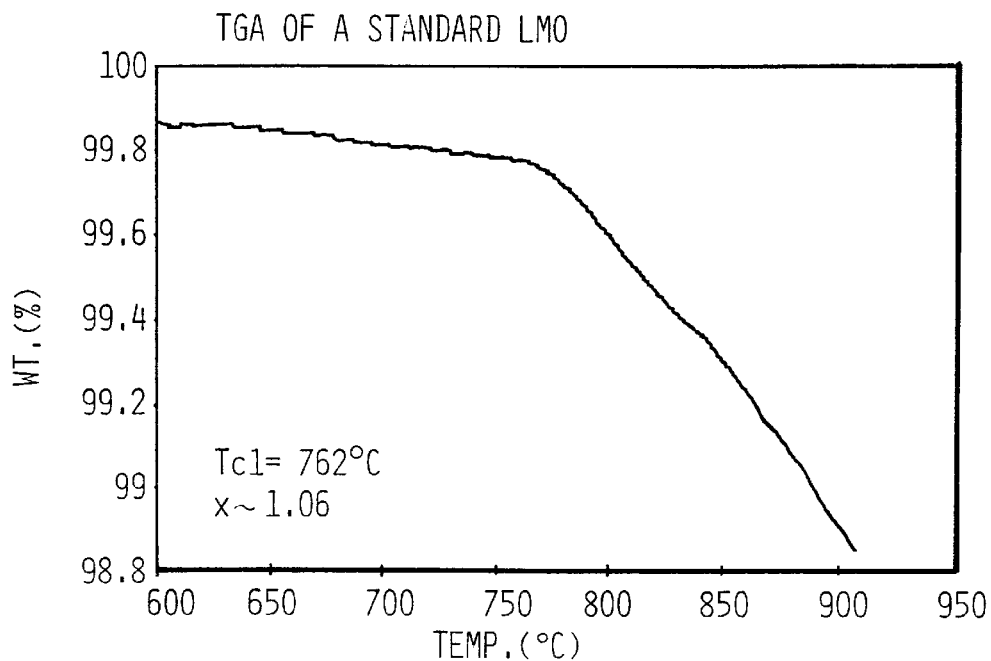
FIG. 8 shows the results of TGA (thermal gravimetric analysis) trace for a standard $LiMn_2O_4$ compound btained from a vendor, Kerr-McGee Chemical Company.
Figure 9:
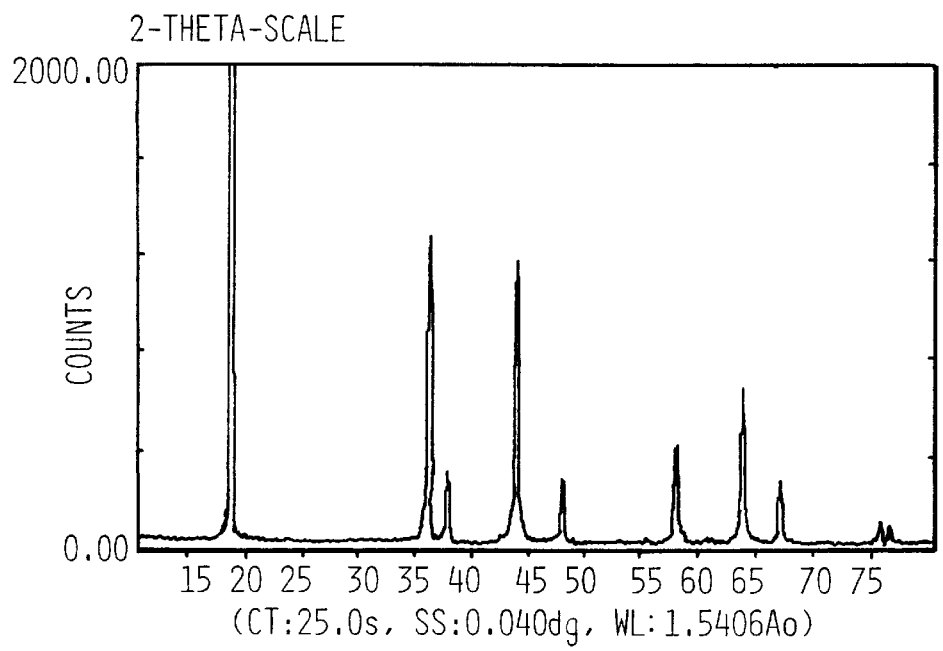
FIG. 9 shows an X-ray diffraction analysis of the conventional $LiMn_2O_4$ product obtained from the vendor Kerr-McGee. The X-ray diffraction was conducted using conventional CuKα type radiation.
Figure 10:
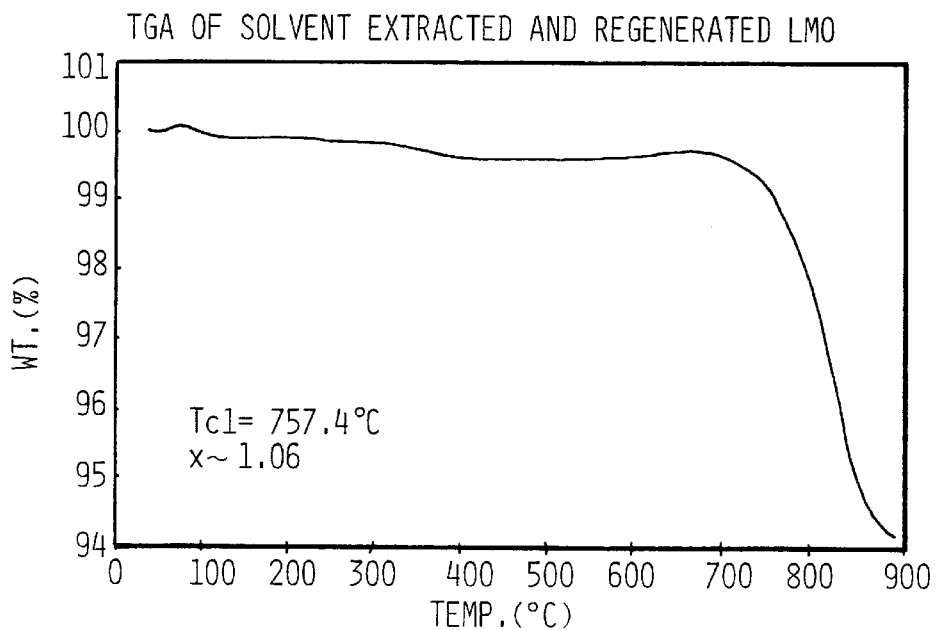
FIG. 10 shows the results of TGA (thermal gravimetric analysis) trace for the regenerated $LiMn_2O_4$ product of the invention prepared according to Example 1 (solvent recovery method).

The quality of the product produced by this solvent extraction (wet) method compares favorably with commercially available $LiMn_2O_4$. FIG. 8 shows the results of TGA (thermal gravimetric analysis) trace for a standard $LiMn_2O_4$ compound obtained from a vendor, Kerr-McGee Chemical Company. FIG. 9 shows an X-ray diffraction analysis of the conventional $LiMn_2O_4$ product obtained from the vendor Kerr-McGee. The X-ray diffraction was conducted using conventional CuKα type radiation. FIG. 10 shows the results of TGA (thermal gravimetric analysis) trace for the regenerated $LiMn_2O_4$ product of the invention prepared according to Example 1 (solvent recovery method).

It can be seen that the TGA traces of FIG. 8 commercial LMO and FIG. 10 regenerated LMO compare very favorably because the curves of FIGS. 8 and 10 look similar, with nearly the same onset (Tc) values. This shows that lithiation is complete and there is no oxygen deficiency in the regenerated product.

Figure 11:
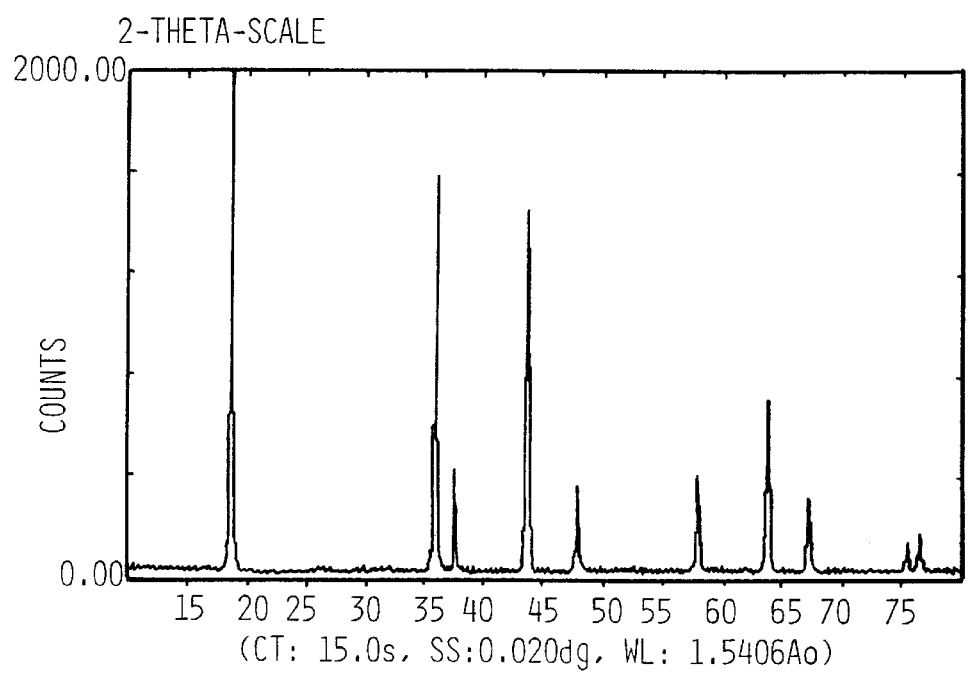
FIG. 11 shows an X-ray diffraction analysis of the regenerated $LiMn_2O_4$ product of the invention prepared according to Example 1 (solvent recovery method). The X-ray diffraction was conducted using conventional CuKα type radiation.

The diffraction analysis shown in FIG. 9 (conventional commercial $LiMn_2O_4$) is nearly identical to the regenerated LMO (FIG. 11) of Example 1. This indicates that the structure of the regenerated compound of the invention is similar to, and essentially identical to, the basic spinel structure of conventional $LiMn_2O_4$.

Example 2

Dry Process

In the second process, FIG. 7, separation of LMO from other cathode chemicals was accomplished by heating the electrode to a temperature high enough to burn polymer, carbon and other impurities. By this method, the formation of liquid waste was avoided. However, the heating of the electrode generated toxic gases such as HF, which must be scrubbed out before venting to air.

The peeled out cathode electrode from the spent battery was first heated in a furnace at 600° C. for two hours. Carbon and polymer were burned off, and LMO particles fell off from the aluminum grid. (FIG. 7, step 4). The grid and LMO particles were separated. LMO thus obtained was then heated with an amount of lithium carbonate calculated to compensate for lost lithium. The heating was at 800° C. in air for 12 hours. Slow heating and cooling rates (2° C. per minute) were used. The amount of lithium in LMO was controlled by the amount of $Li_2CO_3$ added. Thermogravimetric analysis (TGA) and X-ray diffraction were also done to study the composition and structure of the regenerated LMO.

Figure 12:
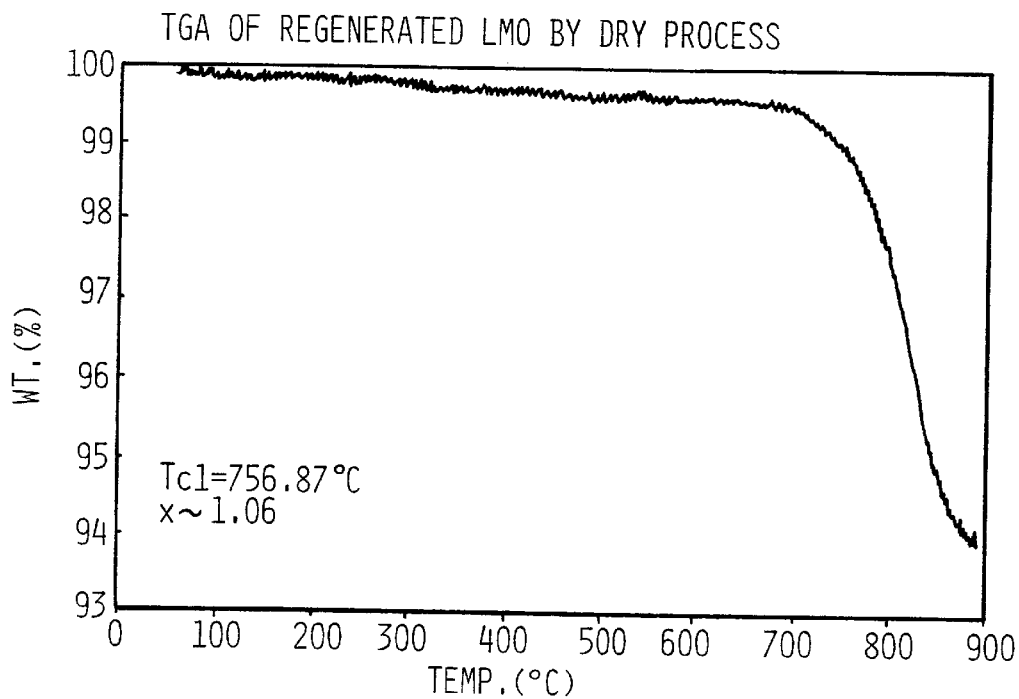
FIG. 12 shows the results of TGA (thermal gravimetric analysis) trace for the regenerated $LiMn_2O_4$ product of the invention prepared according to Example 2 (dry/heat recovery method).
Figure 13:
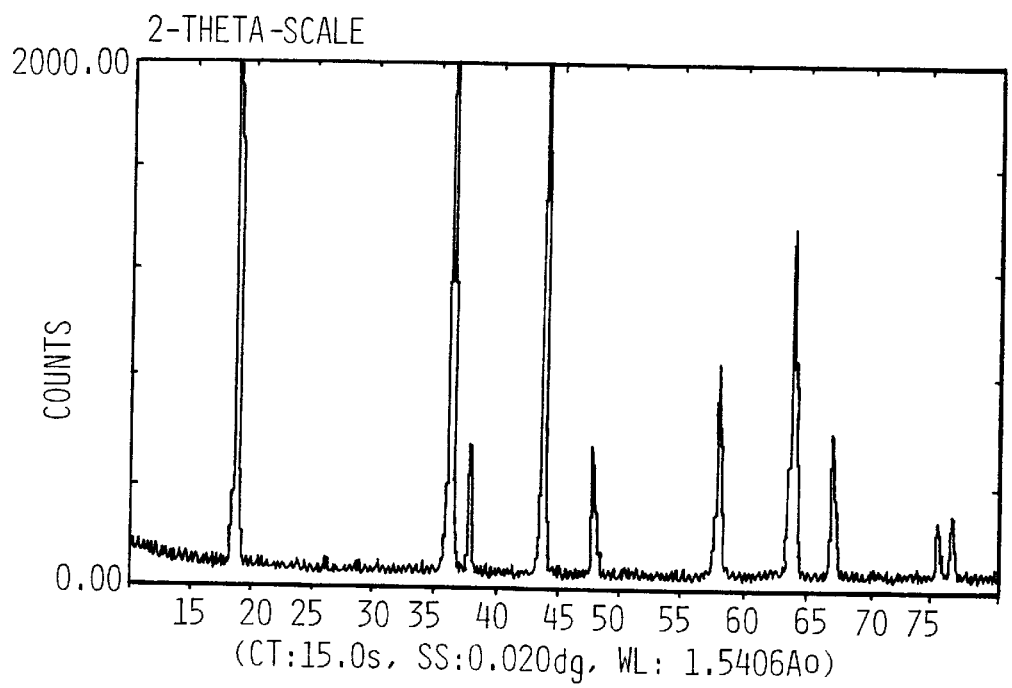
FIG. 13 shows an X-ray diffraction analysis of the regenerated $LiMn_2O_4$ product of the invention prepared according to Example 2 (dry/heat recovery method). The X-ray diffraction was conducted using conventional CuKα type radiation.

The weight-temperature curve measured by TGA (FIG. 12) and the X-ray diffraction pattern (FIG. 13) of relithiated LMO using this second (dry) process compare favorably with the standards of FIGS. 8 and 9. Analysis of the X-ray curves (FIGS. 9 and 13) showed that the lattice constant of the conventional, commercial LMO (FIG. 9) and the regenerated LMO (FIG. 13) essentially match. (See Table.)

Referring to step 4 of Example 2, FIG. 7, it can be seen that the heating step took place at a temperature on the order of about 600° C. in air/oxygen. During this heating step, certain gases were evolved due to the combustion/decomposition of polymer, $LiPF_6$ salt, and carbon. The gases evolved include the following: HF, $PF_5$, $PF_3$. These gases require scrubbing before venting to the atmosphere. A basic solution bath is suitable for this purpose. The heating, step 4, is preferably conducted by ramping up 600° C. temperature. A ramp rate of 5° C. per minute for heating, and then a ramp rate of 2° C. per minute for cooling, were found to be acceptable. It was also found that the optimum temperature for heating was about 600° C., and that a suitable time for heating is about one hour at 600° C. The purpose of this heating step (step 4) is to burn carbon, polymer, and the electrolyte, and thus release the aluminum grid from the LMO particles. Carbon and polymer burn at temperatures below about 600° C. If the temperature is above about 650° C., the aluminum grid may begin to melt. Therefore, this was avoided. A suitable temperature range was found to be on the order of 550° C. to about 625° C. The heating time is not necessarily critical, and was decided based upon the quantity of material heated and the air flow through the furnace. It was found that a minimum of about one hour was adequate for about 3 grams of LMO. The cooling at a ramp rate of about 2° C. per minute was done in the furnace. As per step 5, a sieve was used to separate the aluminum current collector grid from the LMO particles. From this point, the regeneration process shown in steps 6 through 9 of FIG. 7, is essentially the same as the regeneration process shown in steps 7 through 10 of FIG. 6. It should be noted that in the method of Example 2, fluorine may be present as LiF in the final product. There is also a possibility that the LiF reacts with the LMO to form a fluorinated LMO product. It was also proved by material balance of electrolyte that there was only very minute amount of Li salt present in the positive electrode before the recovery and regeneration process started for Example 2. Therefore, the effect of LiF is essentially negligible.

Those skilled in the art understand that the nominal general formula $LiMn_2O_4$ represents a range of compositions that vary depending on the method of commercial preparation. One exemplary expression is $Li_{1+x}Mn_{2-x}O_4$ where $0.2 \leq x \leq -0.2$. In testing the relationship between Li content and the "a" lattice parameter, it was found that at Li close to 1, "a" was about 8.2475; and at Li close to 1.10, "a" was about 8.215. This latter sample was from Kerr McGee. Another LMO sample from Kerr-McGee demonstrated "a" parameter of 8.235 and Li content of 1.04 atomic units. The regenerated LMO recovered by the invention (Example 2) had lattice parameters $a=b=c=8.247686 \pm 0.000226$ Å. In all cases, $\alpha=\beta=\gamma=90°$. This shows that the recovery/regeneration methods of the invention provide commercially reusable products.

TABLE 1

| Solvents | Polarity (polarisabilities for ground state hydrocarbon molecules/ solvents: $10^{-24} cm^3$) | H-bonding (Kcal/mol) |
|---|---|---|
| Acetone | 10.4 | 7 |
| Dimethylacetamide (DMAC) | 11.5 | 10.2 |
| Dimethylformamide (DMF) | 13.7 | 11.3 |
| Dimethylsulfoxide (DMSO) | 16.4 | 10.2 |
| Ethy acetate (EtAc) | 5.3 | 7.2 |
| Methyl ethylketone (MEK) | 9 | 5.1 |
| N-methyl pyrrolidone (NMP) | 12.3 | 7.2 |
| Tetrahydrofuran (THF) | 5.7 | 8 |
| Tetraethyl phosphate (TEP) | 11.5 | 9.2 |

As can be seen by the above description, the first part of the respective processes recover the lithium deficient LMO, and the second part is the reaction of the recovered LMO with the lithium carbonate to form standard battery grade LMO. The entire process advantageously is a combination of recovery and regeneration to form a reusable battery material. This is a striking advantage that minimizes environmental impact. It should be noted that, depending on the type of furnace used for reaction, the physical characteristics of the LMO product may vary, and such characteristics may be selected, as briefly described above. In the examples described earlier, a small lab furnace was used, and a sample of about 3 grams was taken in a small crucible. Except for the initial mixing with lithium carbonate, there was no further mixing of reactants, and the sample remained stationary during the lithiation reaction. Hence, the product after cooling was in the form of a single lump that can be easily rendered to powder form. It is expected that, in a large scale recycling plant, a more effective type of furnace can be used, including essentially constant agitation of the reactants, such as a rotary kiln, thus enhancing the reaction rate and rendering the final product to the preferred powder form. As can be seen, the regeneration of LMO, described above, produces a battery grade LMO. The charge-discharge characteristics of the regenerated LMO have been monitored. Such cycling data showed that the regenerated LMO is compatible with the standard LMO obtainable from Kerr-McGee Chemical Corporation, even though in some cases it showed slightly higher capacity loss during cycling.

Figure 14:
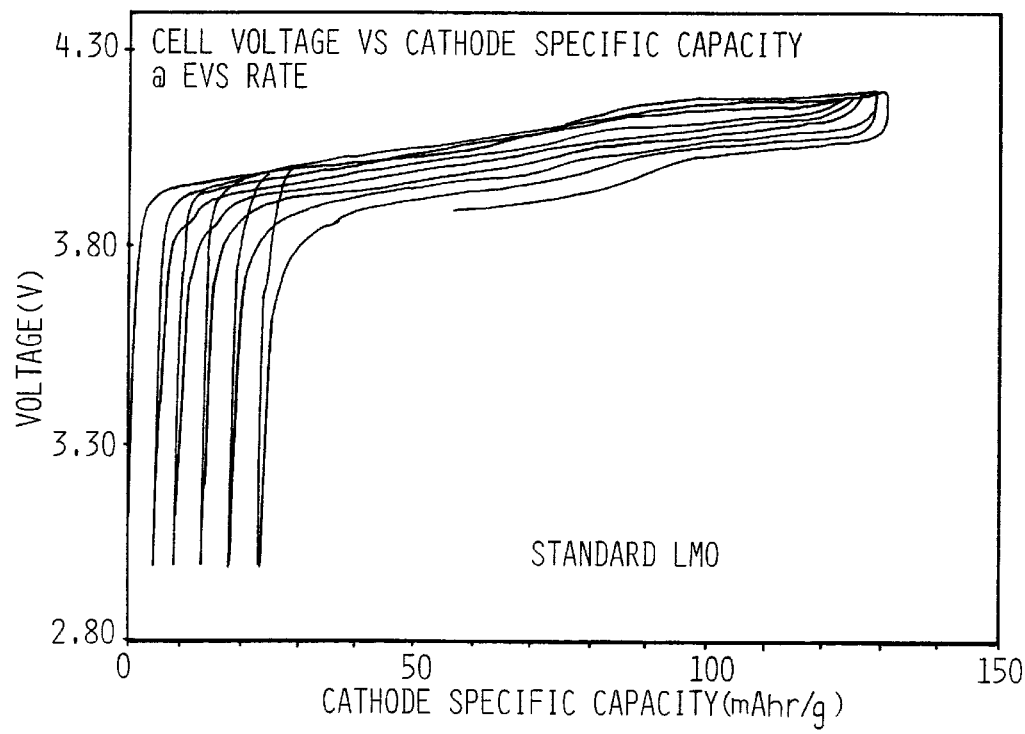
FIGS. 14, 16 and 18 each show a voltage profile, voltage/capacity plot of a test cell, based on lithium manganese oxide (nominally $LiMn2O_4$) electrode active material and using a lithium metal counter-electrode. The data shown in FIGS. 14, 16 and 18 is based on the Electrochemical Voltage Spectroscopy (EVS) technique. The data is based on using constant current cycling at ±50 microamps per square centimeter, between 3.0 and 4.2 volts, using about 50 milligrams of the lithium manganese oxide active material.
Figure 16:
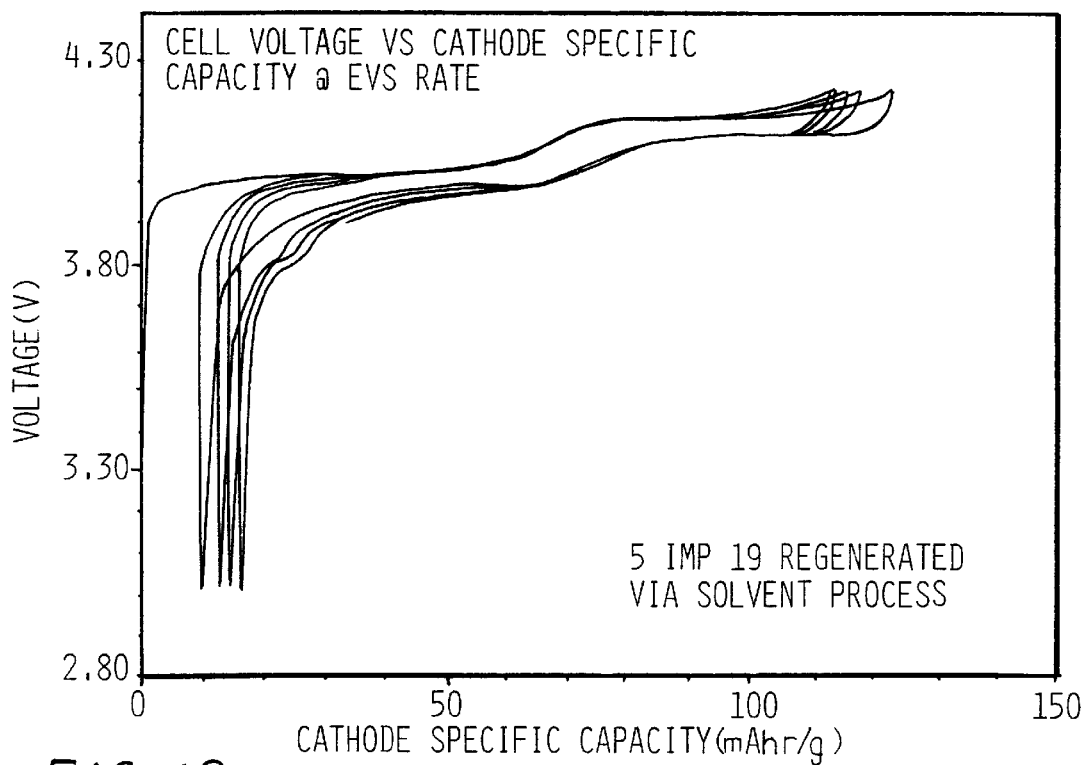
Figure 18:
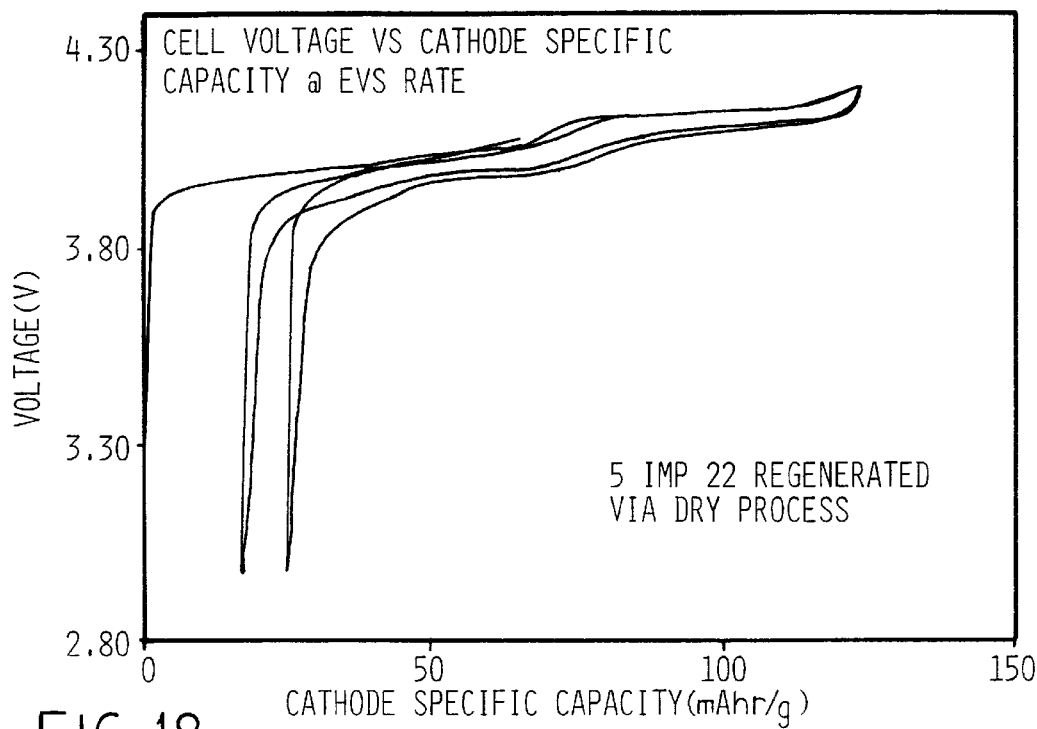

FIGS. 14, 16 and 18 each show the voltage profile versus capacity of a rechargeable cell comprising a lithium metal anode and the LMO cathode active material. FIG. 14 is for a standard $LiMn_2O_4$ (LMO) compound from Kerr-McGee Chemical Company. FIG. 16 is for the recovered and regenerated LMO per the solvent recovery process of the invention. FIG. 18 is for the recovered and regenerated LMO per the dry recovery process of the invention. The cells were tested under EVS conditions where the conditions are equivalent to very slow cycling regime (nominally 50 microamps per square centimeter). The "X" axis represents the capacity relative to the lithium manganese oxide electrode, or the amount of charge corresponding to the insertion/extraction of lithium. The data shown in FIGS. 14, 16 and 18 is based on the Electrochemical Voltage Spectroscopy (EVS) technique. Electrochemical and kinetic data were recorded using the Electrochemical Voltage Spectroscopy (EVS) technique. Such technique is known in the art as described by J. Barker in Synth., Met.28, D217 (1989); Synth. Met. 32, 43 (1989); J. Power Sources, 52, 185 (1994); and Electrochemica Acta, Vol. 40, No. 11, at 1603 (1995).

The standard LMO obtained from Kerr-McGee is considered a baseline, standard lithium manganese oxide, cell-grade material (FIG. 14). It is striking that the regenerated products of FIGS. 16 and 18 show equivalent performance.

Figure 15:
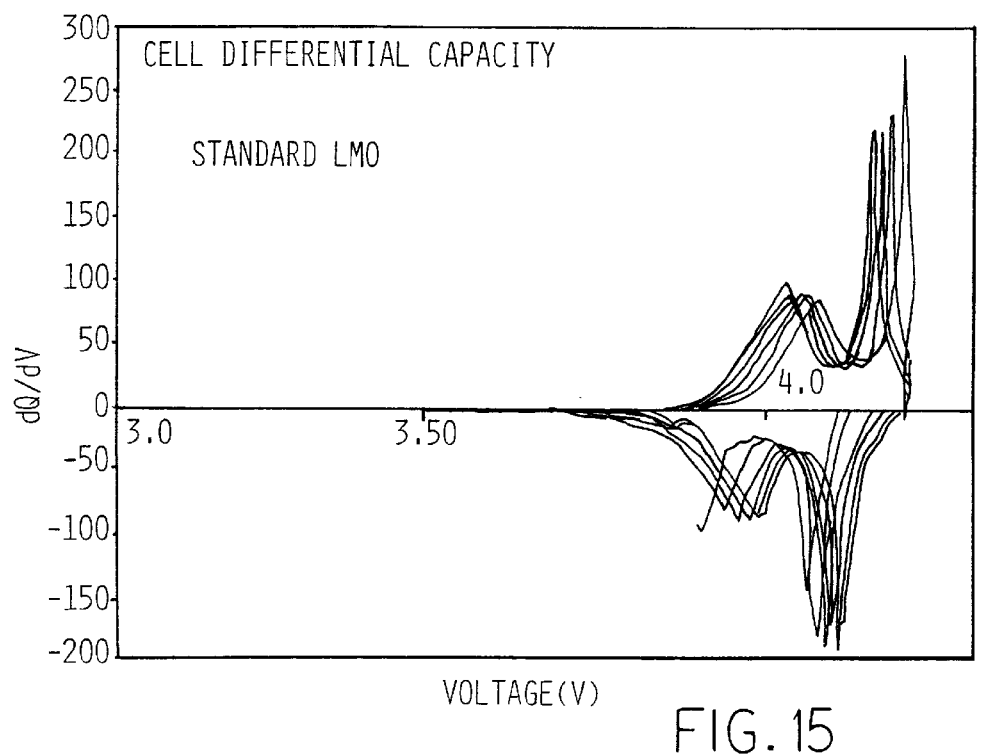
FIGS. 15, 17 and 19 are respective differential capacity plots of FIGS. 14, 16 and 18, also based on the EVS procedure. Plots 15, 17 and 19 are respective derivatives of the curves of FIGS. 14, 16 and 18.
Figure 17:
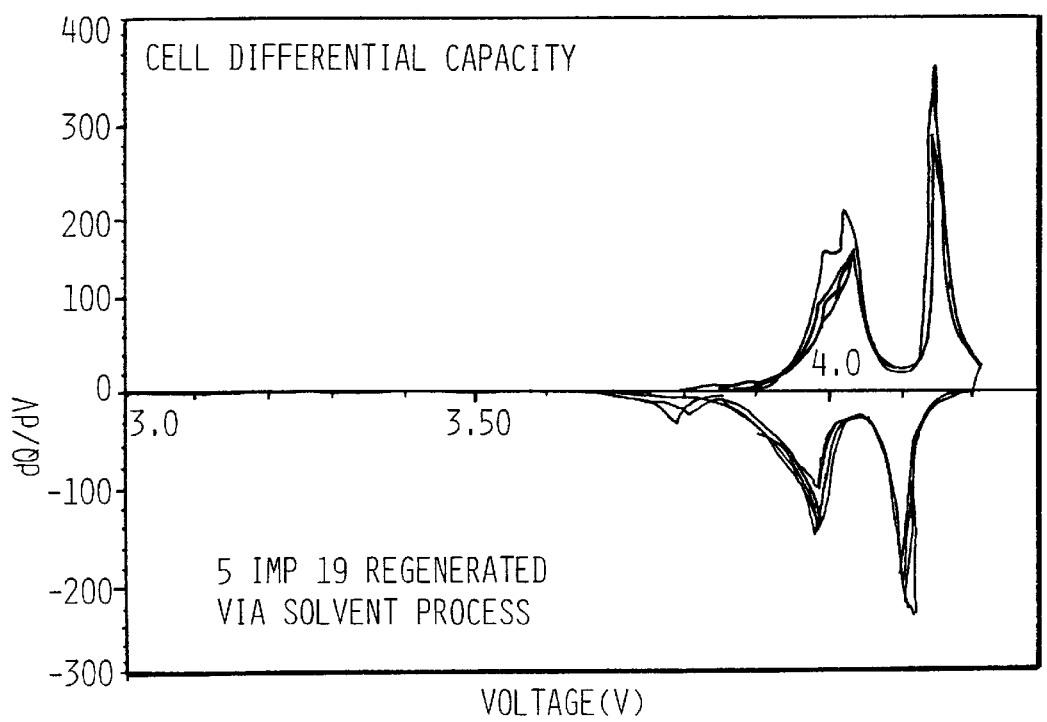
Figure 19:
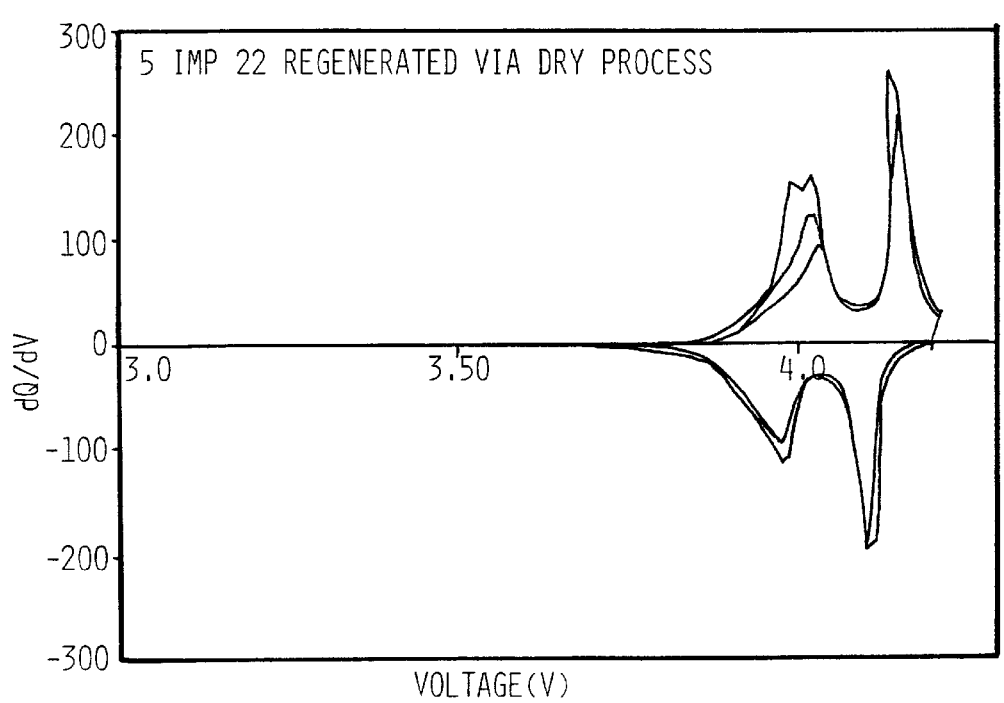
Figure 20:
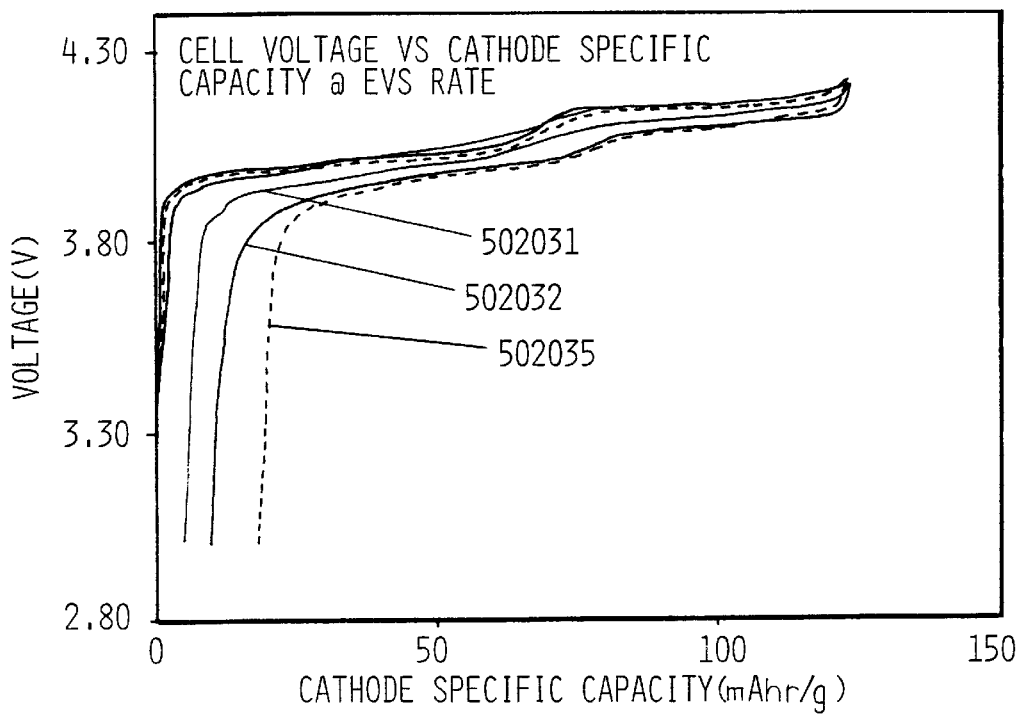
FIG. 20 shows the voltage profiles of respective FIGS. 14, 16 and 18, first cycle, for direct comparison. The cell of FIG. 14 is number 502031 (LMO standard)
Figure 21:
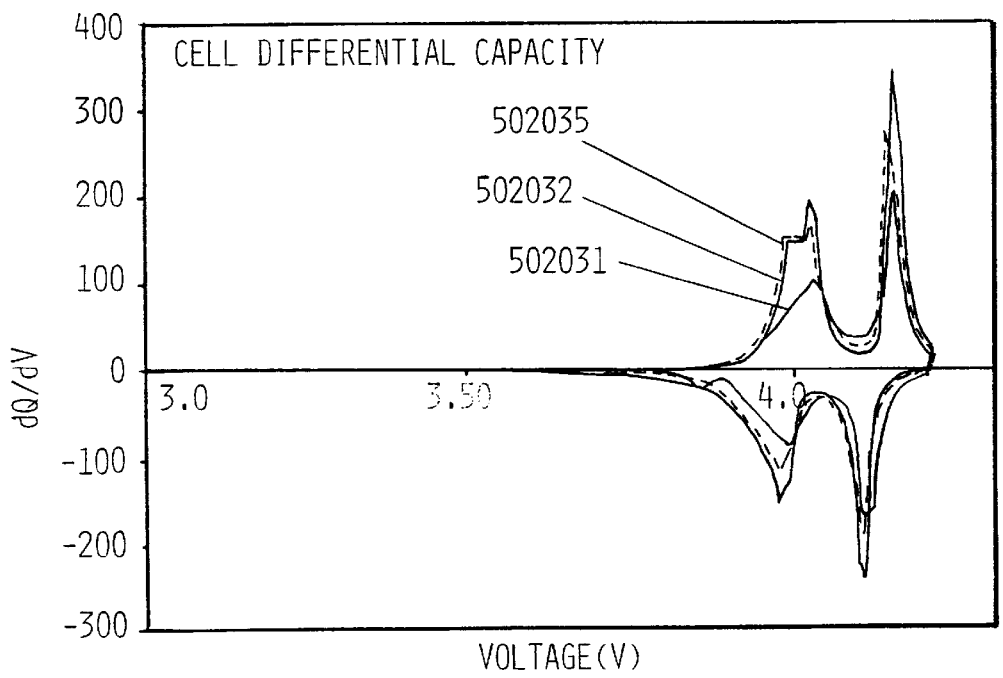
FIG. 21 shows the differential plots of respective FIGS. 15, 17 and 19, first cycle, for direct comparison. The cell of FIG. 15 is 502031 (standard)

FIGS. 15, 17 and 19 are respective differential capacity plots of FIGS. 14, 16 and 18. The performance of the recovered products (FIGS. 17 and 19) is equivalent to the industry standard Kerr McGee LMO (FIG. 15). Each of the plots has a peak showing some degree of irreversibility. All other peaks above the axis (cell charge) have corresponding peaks below the axis (cell discharge). The recovered products have slightly higher first cycle capacity loss, but only on the order of 3–8% higher. FIGS. 20 and 21 provide a useful direct comparison. The slight difference in performance may be merely due to difference in particle size. Optimization of the solvent and dry recovery processes should render performance identical to commercial LMO.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. A method for recovering lithium manganese oxide (LMO) active material from a positive electrode/current collector assembly of an electrochemical cell, the positive electrode portion of said assembly being in the form of a plasticized polymeric matrix and comprising a polymeric binder for retaining particles of said LMO active material, said LMO being lithium-deficient and having a lesser lithium content as compared to a nominal initial condition of LMO before cycling in a cell, said method comprising:

a. removing the positive electrode/current collector assembly from the electrochemical cell;

b. separating the LMO active material particles from the binder and current collector by one of the following steps:
  i. providing a solvent which does not dissolve the LMO or the current collector, placing the assembly in the solvent and dissolving the binder in the solvent to form a solution containing the dissolved polymer and suspended particles of the LMO, removing the current collector from the solution, and then filtering the solution to separate the solvent from the LMO particles; or
  ii. heating the assembly at an elevated temperature to decompose and vaporize the binder, said elevated temperature being below the melting point of the current collector and the LMO, and then separating the current collector from the LMO particles; and then
c. reacting the LMO with a lithium compound, at an elevated temperature which is below the melting point of the LMO, to lithiate the LMO thereby increasing its lithium content.

2. The method according to claim 1 wherein the solvent is acetone.

3. The method according to claim 1 wherein the polymeric binder is a copolymer of vinylidene fluoride and hexafluoropropylene, and the solvent is characterized by ability to dissolve said copolymer.

4. The method according to claim 1 wherein the solvent is selected from the group consisting of tetrahydrofuran (THF), acetone, dimethylacetamide (DMAC), dimethylformamide (DMF), dimethylsulfoxide (DMSO), ethyl acetate (EtAc), methyl ethylketone (MEK), N-methyl pyrrolidone (NMP), and tetraethyl phosphate (TEP).

5. The method according to claim 1 wherein the lithium compound used to lithiate said LMO is a lithium salt.

6. The method according to claim 1 wherein the lithium compound used to lithiate said LMO is selected from the group consisting of lithium carbonate ($Li_2CO_3$), lithium chloride (LiCl), lithium nitrate ($LiNO_3$), lithium acetate ($LiCH_3COO$), lithium oxide ($Li_2O$), and lithium hydroxide (LiOH).

7. The method according to claim 1 wherein in subpart (c), the step of reacting the LMO with the lithium compound is conducted at a temperature in a range of about 735° C. to about 950° C.

8. The method according to claim 1 wherein in subpart (c), the step of reacting the LMO with the lithium compound is conducted at a temperature in a range of about 800° C. to about 850° C.

9. The method according to claim 1 wherein in subpart (c) the step of reacting the LMO with the lithium compound is conducted at a temperature in a range of about 775° C. to about 850° C.

10. The method according to claim 1 wherein in subpart (c) the step of reacting the LMO with the lithium compound is conducted for a period of about 12 hours.

11. The method according to claim 1 wherein in subpart (b)(ii) the heating is conducted at a temperature in a range of about 550° C. to about 625° C.

12. The method according to claim 1 wherein the elevated temperatures of steps (b)(ii) and (c) are respectively reached by raising the temperature at a rate of about 2° C. to about 5° C. per minute.

13. The method according to claim 1 wherein after each of steps (b)(ii) and (c) cooling is conducted from said elevated temperatures, respectively, at a rate of about 2° C. to about 5° C. per minute.

14. The method according to claim 1 wherein before step (c) the lithium content of the LMO is represented by $Li_xMn_2O_4$, x<1 and an amount of the lithium compound is added to increase the lithium content of the LMO to at least x equals 1.

15. A method for recovering a lithium metal oxide, (LMTO) active material from an electrode/current collector element of an electrochemical cell, the electrode portion of said element being in the form of a plasticized polymeric matrix and comprising a polymeric binder for retaining particles of said LMTO active material, said LMTO being lithium-deficient and characterized by a lesser lithium content as compared to a nominal initial condition of LMTO before cycling in a cell, said method comprising:
a. removing the electrode/current collector element from the electrochemical cell;
b. separating the LMTO active material particles from the binder and current collector by one of the following steps:
  i. providing a solvent which does not dissolve the LMTO or the current collector, placing the element in the solvent and dissolving the binder in the solvent to form a solution containing the dissolved polymer and suspended particles of the LMTO, removing the current collector from the solution, and then filtering the solution to separate the solvent from the LMTO particles; or
  ii. heating the element at an elevated temperature to decompose and vaporize the binder, said elevated temperature being below the melting point of the current collector and the LMTO, and then separating the current collector from the LMTO particles; and then
c. reacting the LMTO with a lithium compound at an elevated reaction temperature which is below the melting point of the LMTO, to lithiate said LMTO to the nominal active material initial condition.

16. A method for recovering metal oxide (MTO) active material from an electrode/current collector assembly of an electrochemical cell, the electrode portion of said assembly being in the form of a plasticized polymeric matrix and comprising a polymeric binder for retaining particles of said MTO active material, said method comprising:
a. removing the assembly from the electrochemical cell;
b. separating the MTO active material particles from the binder and current collector by the following steps:
  i. heating the assembly at an elevated temperature to decompose and vaporize the binder, said elevated temperature being below the melting point of the current collector and the MTO; and then
  ii. separating the current collector from the MTO particles.

17. The method according to claim 16 wherein the electrode further comprises particles of carbon and the elevated temperature is selected to burn the carbon.

18. The method according to claim 16 wherein the electrode further comprises particles of carbon, the elevated temperature is insufficient to burn the carbon particles; and after step (ii), the MTO particles are separated from the carbon particles.

19. The method according to claim 16 wherein the electrode further comprises a lithium salt of the formula $LiPF_6$, the binder is a copolymer of vinylidene fluoride and hexafluoropropylene, and step (i) further includes scrubbing effluent gasses formed by decomposition and vaporization of said binder and said salt; said scrubbing accomplished by contacting said effluent gasses with a basic solution.

* * * * *